Feb. 23, 1971     A. F. BATTAGLIA     3,564,616

SAFETY DEVICE

Filed Sept. 8, 1969

INVENTOR

ANGELO F. BATTAGLIA

BY *Edwin E. Greigg*

ATTORNEY

United States Patent Office 3,564,616
Patented Feb. 23, 1971

3,564,616
SAFETY DEVICE
Angelo F. Battaglia, 1703 Walnut St.,
Philadelphia, Pa. 19103
Filed Sept. 8, 1969, Ser. No. 856,052
Int. Cl. A41f 9/00
U.S. Cl. 2—311          5 Claims

ABSTRACT OF THE DISCLOSURE

The invention relates to safety devices for drivers of high speed unenclosed vehicles and includes either as a part separable therefrom, or integral therewith, a strap element which may be used by a passenger riding in tandem to the driver of the vehicle.

---

This invention relates to improvements in safety devices particularly for use by passengers riding in tandem on motorcycles, toboggans, snowmobiles and other high speed unenclosed vehicles of this general type.

At the present time no special safety provisions are available to passengers on high speed vehicles such as those mentioned above other than the fact that some motorcycles have hand grips positioned adjacent to each side of the passenger seats and still others have a loop-type handle positioned to the rear of the tandem seat; on still others no provision whatsoever is provided for the safety of a passenger beyond the seat being of ample size to accommodate two people. However, these safety devices have proved to be inadequate for the purposes intended and as a result passengers who ride in tandem on toboggans and motorcycles are inclined to embrace the driver by grasping their hands in front of the driver which cannot only be uncomfortable for the driver, but such a manner of support for a passenger has proved through research to be dangerous for the passenger since one cannot even free a hand to adjust one's clothing, or for any other purpose, and still maintain a firm grip on the driver unless it consequently be to his discomfort.

Accordingly, it is the principal object of the invention to provide a safety device which encircles the waistline of the driver of a vehicle and which further includes as an element thereof oppositely extending strap means into which the passenger riding in tandem may position his hands.

Another object of the invention is to provide an article of manufacture which may be secured to any type of belt at least one end of which includes a buckle to permit fastening the belt around the body of a vehicle driver with the article being provided with portions for grasping by the hands of a passenger riding in tandem.

Other objects and advantages will become apparent from the following description taken in conjunction with the accompanying drawings, in which.

Figure 1:
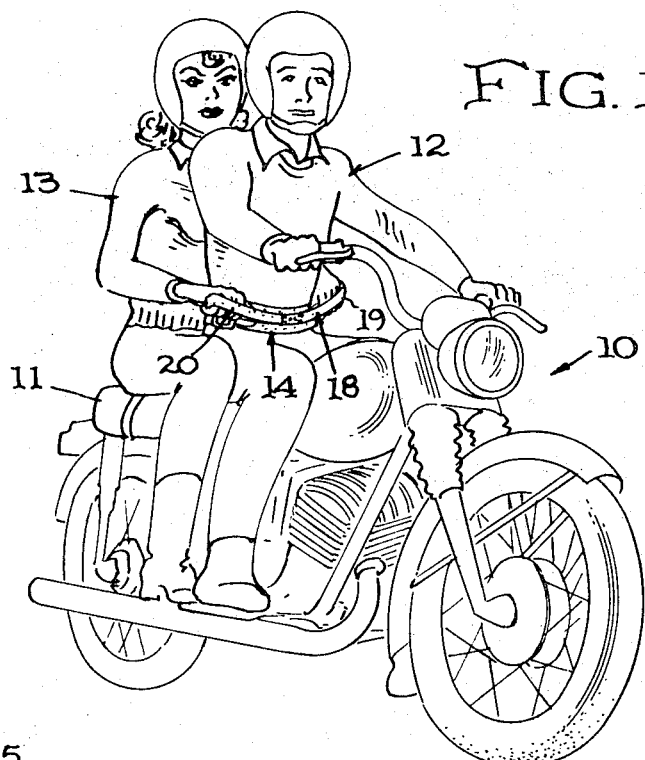
FIG. 1 is a view of a driver and a passenger riding in tandem on a motorcycle with the passenger's hands shown grasping the strap.

Turning now to the drawings and particularly FIG. 1, there is shown a motorcycle 10, of any style or make, all of which include a suitable seat 11, for the driver as well as the passenger who rides in tandem thereon. Also, in this view are shown with the motorcycle a driver 12, and a passenger 13, to the former of which has been applied in encirclement of his waist a flexible belt 14, of any suitable fabric or leather-like material and to one end of which is secured a buckle 15 that is provided with the normal friction-type gripping means 16, to prevent slippage of the belt once it is positioned on the body of the user.

Figure 2:
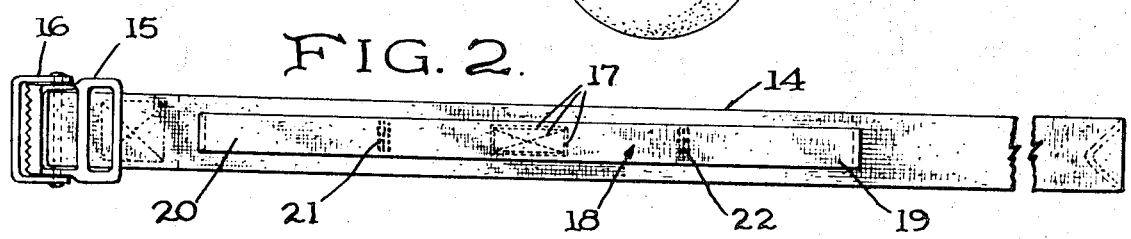
FIG. 2 is a front elevational view of a standard type flexible belt to which the strap handles are secured.

In FIG. 2, the belt 14 has secured thereto by stitches 17 a handle or strap means 18. The strap 18 is constructed of a loop of suitable material such as flexible fabric, webbing, or pliable leather preferably of a more narrow width than the belt 14, in order that the loops 19 and 20 will be conveniently arranged for grasping by the hands of a passenger riding in tandem to the driver.

Figure 3:
FIG. 3 is a top plan view of the device shown in FIG. 2.
Figure 4:
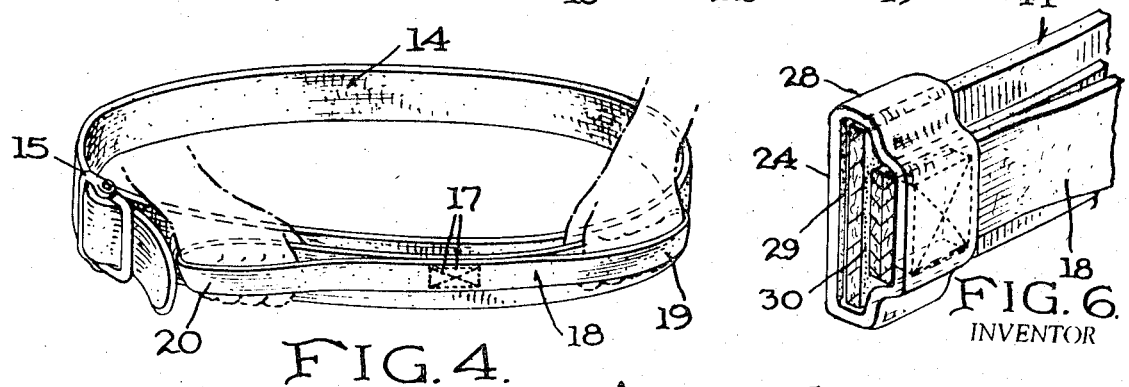
FIG. 4 is a perspective view showing one's hands inserted into the straps.

FIG. 3 is the top plan view of the belt 14, to which has been secured the looped grasping means 19 and 20 and as indicated at 21 and 22, additional rows of stitching may be availed of in order to provide smaller areas into which the passenger may insert his fingers when using the safety device, or, as shown in FIG. 4, the loops may be left unstitched thus providing a larger area for entrance of the hands. This may be found more convenient particularly in cold weather when the passenger may have to wear heavy gloves.

Figure 5:
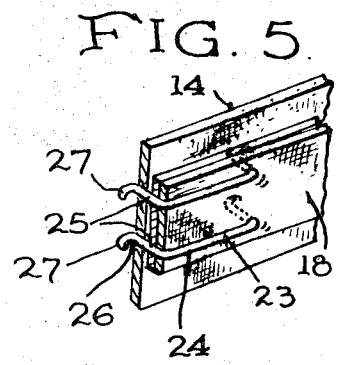
FIG. 5 shows another embodiment in which a staple is used for securing the strap handles to the belt.

In FIG. 5 there is shown a portion of the juncture area between the belt 14, and the strap means 18, which is secured thereto by way of a staple means 23. The staple has an elongated flat surface 24 and offstanding leg portions 25 that will permit it to be driven through the looped material forming the handle and then through the belt 14, whereupon the legs are formed with a reentrant bend 26 and the teeth 27 are driven back through the belt into the handle element thereby locking the belt and straps securely together as a unit.

Figure 6:
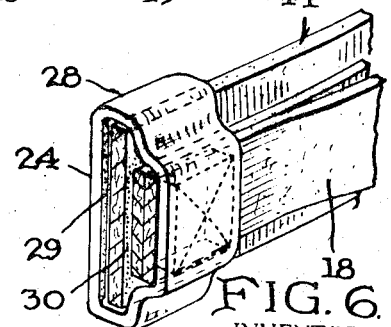
FIG. 6 shows a still further embodiment of a tubular member to which the strap handle is secured and slideably arranged on the driver's belt.

In FIG. 6 the handle 18 is positioned in a tubular sleeve 28 which is suitably secured thereto in any desired manner with the sleeve being adjustable along the length of the belt 14. Moreover, it is contemplated that the interior surface of the tubular sleeve may have bonded thereto any suitable rubberized or plasticised material as shown at 29, which is capable of creating a frictional or gripping contact between it and the belt 14. In addition, the abutting surface between the belt 14 and the looped material may also have bonded thereto a friction creating material as illustrated at 30, which also provides a further means to prevent slippage between the belt 14 and that surface of the strap which is in contact therewith.

What is claimed is:

1. In an improved belt having hand grip elements for use by passengers riding in tandem on a vehicle, the combination comprising an elongated belt means having front and rear surfaces constructed of a pliable material capable of encirclement of the waistline of the human body, strap means including oppositely extending left-hand and right-hand loop portions through which a passenger riding in tandem may insert his hands carried by said belt means and extending along the front surface thereof, means associating said strap means with said belt means and buckle means for securing the belt means and the strap means supported thereby to a driver.

2. In an improved belt as claimed in claim 1, wherein the strap means is slideable longitudinally of the belt.

3. In an improved belt as claimed in claim 2, wherein the strap means includes a tubular portion through which the belt extends.

4. In an improved belt as claimed in claim 1, wherein the strap is stitched medially of its extent to said belt.

5. In an improved belt as claimed in claim 1, wherein the strap means is secured by staple means to the belt, said staple means including an elongated flat body having a pair of right angularly offstanding bendable legs.

References Cited
UNITED STATES PATENTS
| | | | |
|---|---|---|---|
| 3,487,474 | 1/1970 | De Meo | 2—311 |
| 1,903,081 | 3/1933 | Wotherspoon | 2—338X |
| 2,857,086 | 10/1958 | Chamberlin et al. | 182—4 |
| 3,458,188 | 7/1969 | Infante | 2—312X |

FOREIGN PATENTS
| | | | |
|---|---|---|---|
| 72,350 | 4/1951 | Denmark | 182—4 |

JORDAN FRANKLIN, Primary Examiner

G. V. LARKIN, Assistant Examiner

U.S. Cl. X.R.

297—385